Oct. 11, 1966  G. H. ACKER  3,278,038
STRAINER
Filed April 29, 1963  3 Sheets-Sheet 1
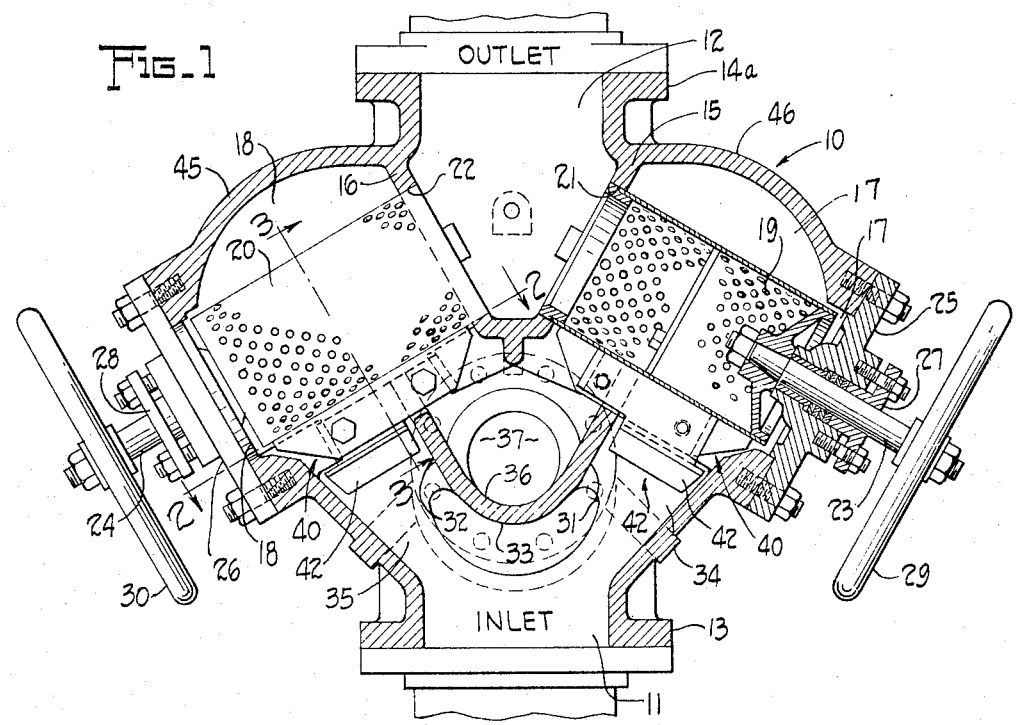
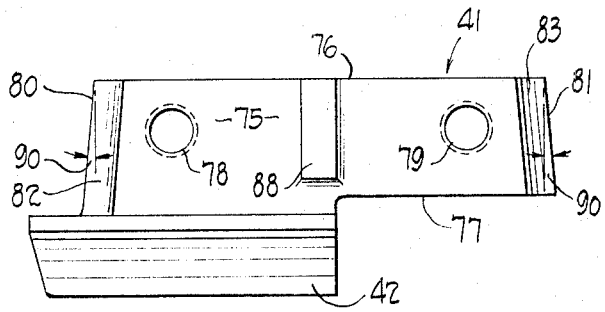
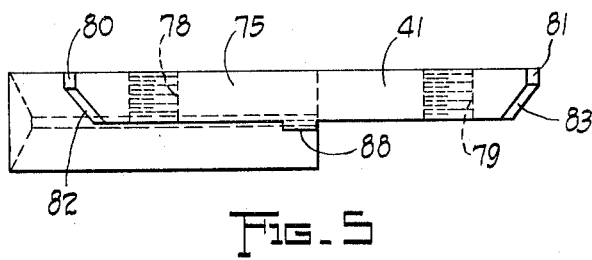
INVENTOR.
GEORGE H. ACKER
BY
Schramm, Kramer & Sturges
ATTORNEYS.

Oct. 11, 1966   G. H. ACKER   3,278,038
STRAINER
Filed April 29, 1963   3 Sheets-Sheet 2

INVENTOR.
GEORGE H. ACKER
BY
Schramm, Kramer & Sturges
ATTORNEYS.

Oct. 11, 1966  G. H. ACKER  3,278,038
STRAINER
Filed April 29, 1963  3 Sheets-Sheet 3
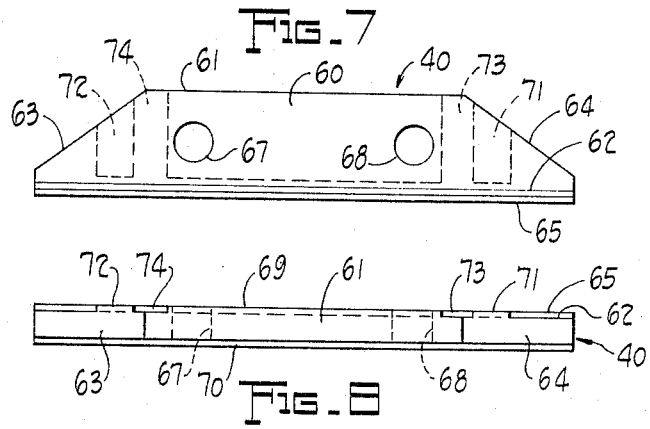
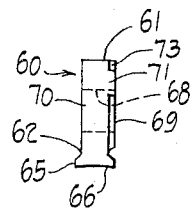
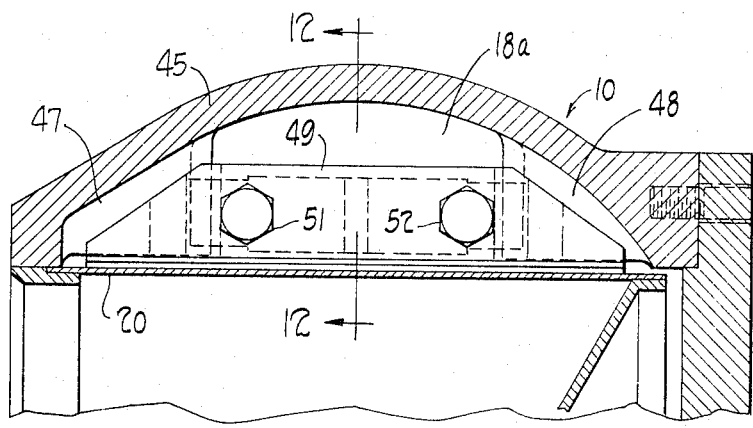
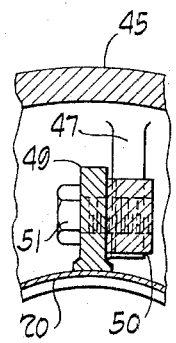
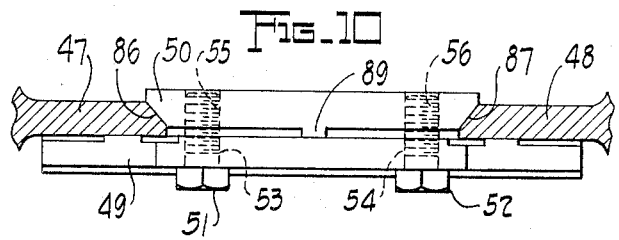
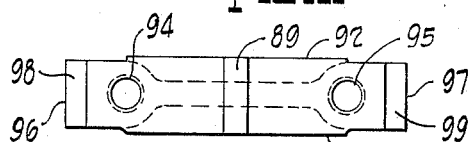
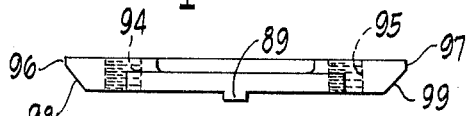
INVENTOR.
GEORGE H. ACKER
BY Schramm, Kramer & Sturges
ATTORNEYS

United States Patent Office

3,278,038
Patented Oct. 11, 1966

---

3,278,038
STRAINER
George H. Acker, Shaker Heights, Ohio, assignor to Eaton Manufacturing Company, a corporation of Ohio
Filed Apr. 29, 1963, Ser. No. 276,393
3 Claims. (Cl. 210—396)

This invention relates to strainers for the removal of suspended matter in liquids flowing through pipe lines, and more particularly to strainers having improved scraping means for removing from the straining screens retained matter separated from a flowing liquid, and improved means for clamping and positioning said scraper means in the apparatus.

This invention is particularly directed to strainers of the type described in the patent to Hellan, 2,354,752, and wherein there are provided a casing having inlet and outlet openings, internal dividing walls converging from the outlet and traversing the casing and defining a strainer compartment therebetween. The dividing walls of such structure are provided with openings therethrough for effecting communication between the strainer compartment and the outlet opening. Cylindrical screens are rotatably positioned in the strainer compartment having their open ends supported in the openings of the dividing walls. A dividing wall structure is provided at each inlet forming individual inlet passages to each of the cylindrical screens within the casing. Scraping means, in the form of a beveled blade, coact with each of the rotatable cylindrical screens to remove accumulated retained matter which is collected in a central sediment pocket between the diverging walls.

Conventionally, the scraper blades in these devices have been formed from a plate of bronze of uniform thickness, and the scraping edge beveled to provide a knifing action against the surface of the screen for easier and more complete sediment removal. Such prior blades had a sharp edge caused by an 8° relief or bevel, and where mounted so that if the screens were rotated clockwise, they would pass under the sharp edge of the scraper blade first. While the action of such blades was satisfactory for a period of time and so long as the cylindrical screens were rotated in a single direction, the practice of the operators was to revolve the screens in both directions. This practice caused material deposited on the outer surface of the screens to be wedged under the scraper blade causing damage to the screen and wear to the blade, and necessitating too frequent maintenance.

The present invention provides not only an improved scraper structure, but also a double acting scraper which is operative when the screen is rotated in either direction without build-up of material thereunder resulting in damage to the screen. Thus, the improved scrapers of this invention may be inserted in presently existing devices, and also used in conjunction with the improved blade supporting means herein described to provide improved strainers.

To the accomplishment of the foregoing and related ends, said invention then consists of the means hereinafter fully described and particularly pointed out in the claims, the annexed drawings and the following description setting forth in detail certain preferred embodiments of the invention, such disclosed means constituting, however, but one of the various structural forms in which the invention may be used.

In the annexed drawings:

FIG. 1 is a longitudinal cross-section through a strainer having two rotatable cylindrical screens and each equipped with the improved scraper blades of this invention.

FIGS. 4, 5 and 6 are, respectively, plan, top and end elevations of the combined clamp bar and deflector rib.

FIGS. 7, 8 and 9 are, respectively, plan, top and end elevations of a scraper blade of the improved structure hereof.

FIGS. 10, 11 and 12 show the installation of an improved scraper blade in a strainer of the type shown in Patent 2,354,752; FIG. 10 showing a fragmentary cross-sectional view of one of the strainer chambers having a scraper blade-clamp assembly mounted in the crown.

FIG. 11 is a top elevation of the scraper-blade clamp assembly with the chamber crown cut away.

FIG. 12 is a fragmentary cross-sectional view taken in the plane indicated by the line 12—12 of FIG. 10.

FIG. 13 is a plan view of the scraper clamping bar shown in FIGS. 10 and 11.

FIG. 14 is a top view of the clamping bar shown in FIG. 13.

Figure 2:
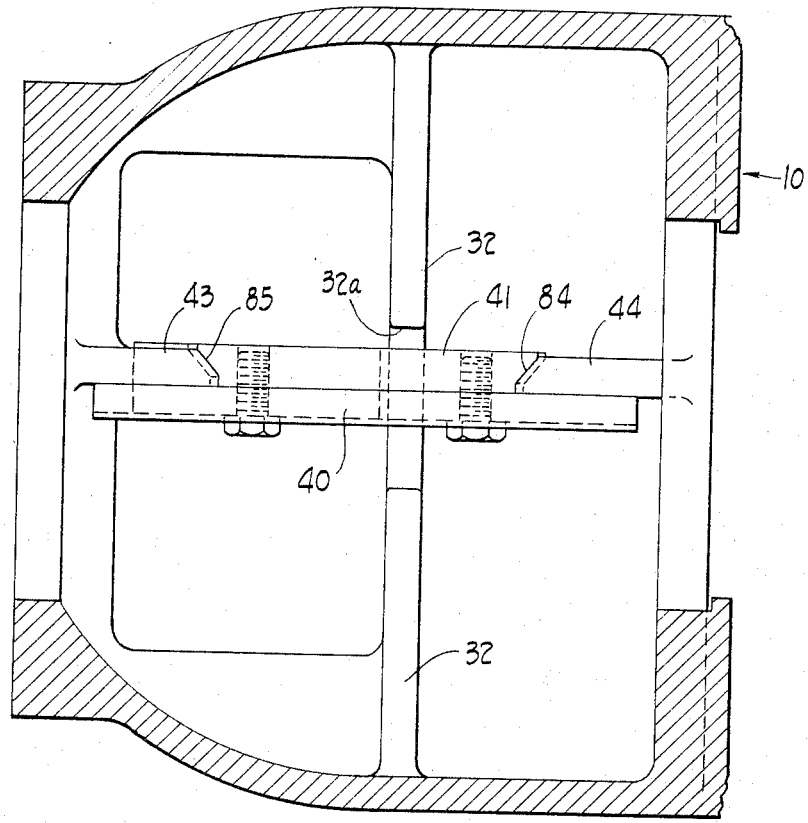
FIG. 2 is a transverse cross-section through the section shown in FIG. 1 and taken in the plane indicated by the line 2—2 of FIG. 1.

Briefly stated, the present invention is in the provision of improved scraping means and improved means for clamping such scraping means within a sediment removing liquid straining apparatus. The improved scraper means comprises in general an elongated body portion having a scraper engaging portion along one edge thereof, said scraper engaging portion having a longitudinal concave screen engaging face adapted to be disposed in scraping engagement with a rotary cylindrical strainer element of the type described in the aforementioned Hellan Patent No. 2,354,752. More particularly, the present invention is concerned with scraper means having in coacting relation therewith clamping means for removably and adjustably securing said scraper means to inwardly extending integrally cast ribs or lugs within the housing of said strainer apparatus.

Still more specifically, since the ribs or lugs are cast and the bearing surfaces are not very accurate, and because the screen engaging surface of the scraper is adapted to conform rather closely to the cylinder O.D., the scraper body is desirably provided with bearing lands which provide a limited bearing area for abutment against the ribs in the strainer casing. Accordingly, it is feasible to do some fitting, e.g., by grinding, on the bearing lands of the scraper body in order to enable the scraper to be brought into satisfactory alignment with the axis of the cylindrical screen.

Still more specifically, a deflector rib may be provided in integral coacting relationship with the adjustable clamping means and scraper means to permit ready removal, and replacement of all of these elements when necessary.

Referring now more particularly to FIG. 1, the liquid straining apparatus as shown comprises a casing 10 having an inlet 11 and an outlet 12 of equal size and in direct line with each other. The inlet 11 is provided with flanged ends 13 for attachment to flanges of a pipe line, and the outlet 12 is likewise provided with a flanged mouth 14a for attachment to the flanges of a pipe line. The casing 10 is conveniently cast as a single piece and has integrally formed therewith walls 15 and 16 for separating the chambers 17 and 18 surrounding the strainers 19 and 20, respectively from the outlet 12.

The casing 10 is symmetrical about the axis through the inlet 11 and the outlet 12, each side housing a screen 19 and 20, respectively. In flowing through the device, the liquid stream is divided, part flowing through each screen.

As indicated above, screens 19 and 20 are rotatably mounted in openings 21 and 22 in walls 15 and 16, respectively, at their exit ends, and keyed to shafts 23 and 24 at their opposite ends. Shafts 23 and 24 are supported in casing covers 25 and 26 rotatably mounted in stuffing boxes generally indicated at 27 and 28. Handwheels 29 and 30 are mounted on the outer ends of shafts 23 and 24 for effecting rotation of the strainer screens 19 and 20, respectively, when the accumulation of deposits makes this necessary. Unidirectional rotation of the screens, e.g. clockwise rotation, was preferred in the prior devices because of the construction of the scraper blade. With the present devices, rotation in either or both directions is not only permissible, but desirable for more effectual sediment removal from the cylindrical screens 19 and 20.

The axes of rotation of the screens 19 and 20 in a two-screen device desirably intersect at an angle of about 120° which angle is bisected by the centerline through the inlet 11 and the outlet 12. A larger angle up to about 180° may be used if desired. A smaller angle may also be used but will entail some lengthening of the casing.

Within the casing 10 and adjacent the inlet 11 are dividing walls 31 and 32 forming an angle, with each other, the apex 33 of which is conveniently rounded and directed toward the inlet in a manner to define two passages 34 and 35 formed by the dividing walls 31 and 32 and the casing 10. Fluid entering through inlet 11 is divided by this structure into two equal cross-sectional areas whose summation is not less than the area of the inlet 11. Thus, the volume of flow toward each of the screens 19 and 20 is equal and tends to remain so.

On the sides of the walls 31 and 32 opposite the inlet 11 and facing toward outlet 12, a receptacle 36 is formed which serves to collect and direct the sediment strained from the liquid to sediment discharge outlet 37. Drain outlet 37 is conveniently a flanged outlet as indicated in FIG. 1 by the dotted lines adapted to be bolted to any convenient correspondingly flanged waste line.

Figure 3:
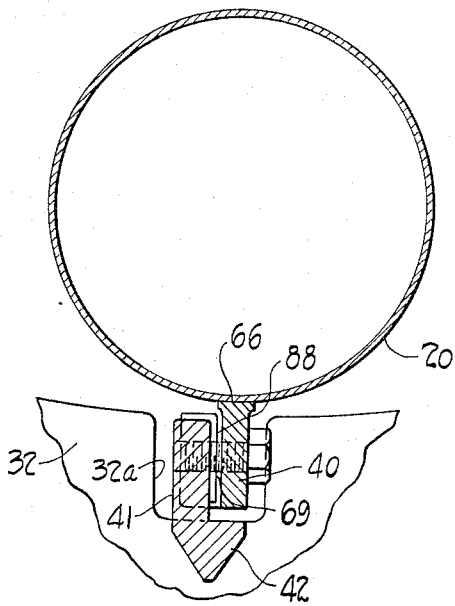
FIG. 3 is a section taken in the plane indicated by the line 3—3 of FIG. 1 and showing the combined clamp bar and deflector rib with the scraper blade attached.

In a preferred embodiment shown in FIG. 1, there is shown an improved scraper 40 and clamping bar 41 (shown in cross-section in FIG. 3). Clamping bar 41 desirably also has integrally cast therewith a deflector rib 42 adapted to fit into passage 35. A corresponding structure appears in passage 34. The deflector rib 42 has a generally V-shaped cross-section with the apex pointing in a direction opposing the flow. The purpose of rib 42 is to prevent impingement of suspended solids against screens 19 and 20 which may otherwise cause damage to and undue wear on the screens. Fluid flow is thus deflected and directed into the strainer compartments 17 and 18 where it flows evenly over and along the screens and through the perforations therein to the interior thereof, through the openings 21 and 22 and into outlet passage 12. Material carried into the strainers 19 and 20 by the incoming flow that is too coarse to penetrate the openings in the screens may or may not adhere directly to the screens 19 and 20; some portion will be carried by liquid currents into sediment receptacle or pocket 36 where it collects before being flushed out drain or discharge outlet 37 under line pressure when a valve in the outlet line is opened. Some heavier material, e.g. sand, may be prevented from passing through the openings in the screen by virtue of its resistance to change in angular direction, and find its way into pocket 36. By locating the scraper 40 below strainer screen 20, the strainer 20 is made more effective in that incoming water can pass freely around the strainer screen and any flow-impeding material adhering to the surface thereof is scraped off more directly into the flow of any water going out through drain opening 37.

The process of cleaning the strainer consists of opening the drain line connected to the outlet 37 communicating with pocket 36. With that line open, the screens 19 and 20 are rotated several turns against the stationary scrapers to dislodge the collected material. The latter is removed through the open drain. After cleaning the screens, the drain valve is closed.

The interior walls of casing 10 are conveniently adapted, as shown in FIG. 2, for example, to provide scraper positioning means integrally cast therewith. FIG. 3 is a cross-sectional view taken in the plane indicated by the line 3—3 in FIG. 1. FIG. 2 shows casing 10 having integrally cast on the interior walls thereof inner dividing wall 32, and oppositely disposed inwardly directed clamping lugs or ribs 43 and 44 which lie in a common plane and extend partly across the interior. Notch 32a is provided in inner dividing wall 32 to accommodate the scraper 40 and clamping bar 41. Ribs 43 and 44 provide a mount for securing scraper 40 in confronting scraping engagement with rotatable cylindrical screen 20. Similar structure is provided in chamber 17.

Instead of locating the improved scraper hereof in the preferred position indicated in FIGS. 1–3, it may also be located above screen 20 directly under removable screen chamber crown 45 as shown in FIGS. 10 to 12. In the latter modification, crown 45 is provided with scraper positioning means integrally cast therewith. FIG. 10 is a fragmentary cross-sectional view of one of the screen chambers 18a (the other being a duplicate thereof) showing integrally cast oppositely disposed inwardly directed clamping ribs 47 and 48 which lie in a common plane and extend partly across the interior of chamber 18a.

Double acting scraper 49 and clamping bar 50 are secured together in clamping relation with ribs 47 and 48 by any suitable fastening means such as bolts 51 and 52 coacting between the two and not interfering with or intersecting ribs 47 and 48. Scraper 49 is provided with spaced bores 53 and 54 and clamping bar 50 is provided with tapped holes 55 and 56 for receiving and retaining threaded bolts 51 and 52.

With the exception of the depending deflector rib 42, clamping bars 41 and 50 and double acting scrapers 40 and 49 have similar configurations, and are conveniently formed in bronze, or other durable material.

Details are shown in FIGS. 7–9 of a scraper 40 or 49, both of which may have the same structure for disposition in the liquid strainer apparatus as shown in FIG. 1, or as shown in FIG. 10.

The scraper is conveniently and preferably an elongated planar body 60 having parallel top and bottom marginal edges 61 and 62, respectively. The lateral edges 63 and 64 may be shaped to accommodate the casing 10, and in the example shown in FIGS. 7–9, the planar scraper body has a trapezoidal shape. Along one of the parallel marginal edges, e.g. edge 62, there is provided an elongated screen engaging portion 65 having a concave screen contacting face 66 the radius of the concavity of which is preferably equal to the radius of the outer surface of the cylindrical screen, e.g. screen 20. Preferably the screen contacting portion 65 is a bilaterally extending flange. With such construction the scraper is operative when the screen 20, for example, is rotated in either direction about its axis without causing undue wear on either the screen contacting surface 66 of the scraper or the screen 20 because wedging of material between the scraper and the screen is eliminated.

Scraper 40 is provided with two spaced holes 67 and 68 piercing the planar body 60 and adapted to receive headed bolts therethrough for clamping coaction with a clamping bar as hereinafter more particularly described. One side 69 is preferably especially adapted to be disposed in confronting relation with the inwardly extending ribs, e.g. ribs 47 and 48 (FIG. 10) or ribs 43 and 44 (FIG. 1). Side 70 is facing away from the ribs and the coacting clamping bar.

Rib confronting face 69 of scraper 40 is desirably provided with a pair of rib surface contacting shoulders or lands 71 and 72 disposed for abutment against the inwardly directed ribs, e.g. ribs 47 and 48 (FIG. 10), and a pair of relief grooves or recesses 73 and 74 which confront and extend bilaterally to either side of the free extremities of the ribs. Scraper body lands 71 and 72 are preferably disposed normal to the screen contacting portion 65. Reliefs 73 and 74 are adjacent and parallel to lands 71 and 72. The balance of face 69 of scraper body 40 is preferably although not essentially in the same plane as the plane of the rib contacting faces of lands 71 and 72. Lands 71 and 72 provide a reduced area rib contacting portion each of which may be individually and conveniently fitted, if necessary, for proper alignment of the scraper 40 in parallel relation with the axis of cylindrical screens 19 and 20.

Clamping bars are shown in detail in FIGS. 4–6 and FIGS. 13 and 14. That shown in FIGS. 4–6 includes a deflector rib and is adapted for use in devices where the scraper is located below the screen adjacent the liquid inlet. The bar shown in FIG. 13 is especially adapted for disposition with a scraper in the crown portion of a screen cavity.

Referring now more particularly to FIGS. 4–6 the clamping bar 41 here shown includes an elongated generally planar bar 75 having parallel marginal edges 76 and 77 and having tapped holes 78 and 79 adapted to receive and retain bolts extending from the scraper. The lateral edges 80 and 81 are conveniently slightly sloped divergingly from edge 76 toward edge 77 (FIG. 4), or they may be parallel as shown in FIG. 13. In order to aid in centering and locating the scraper, clamping bar 41 is preferably provided with beveled lateral marginal faces 82 and 83 which are adapted to coact with complementarily beveled rib faces, e.g. faces 84 and 85 of FIG. 2, or faces 86 and 87 of FIG. 11. The coactive effect of the rib contacting lands, e.g. lands 71 and 72 (FIG. 8), the beveled rib faces 85 and 84 (FIG. 2), the correspondingly beveled clamping bar marginal faces 82 and 83 (FIG. 4), and the fasteners, e.g. bolts, is to locate and center the scraper between the inwardly extending ribs, e.g. ribs 43 and 44 (FIG. 2), or ribs 47 and 48 (FIG. 11).

In order that the coactive effect above described may be most effectively achieved without distortion of the scraper the clamping bars shown herein are each also conveniently and desirably provided with a centrally located scraper face engaging shoulder or land, such as land 88 (FIGS. 4–6) or land 89 (FIGS. 13–14). Lands 88 and 89 function similarly in either case. Land 88 is located and proportioned to confront face 69 of scraper 40 and preferably contact face 69 to provide support for the central portion of scraper 40 so that it is maintained substantially in one plane while tightly clamped against the inwardly extending ribs. Thus, the beveled faces of the clamping bar, e.g. faces 82 and 83 of FIG. 5 may be tightened against beveled rib faces 84 and 85 without distortion of the longitudinal concave groove or screen contacting face 66, which must lie along a cylindrical element parallel to the axis of the cylindrical screen in order to avoid wear on the parts due to misalignment.

The clamping bar shown in FIG. 4 has integrally formed therewith a deflector rib 42 depending from the lower marginal edge 77 and adapted for disposition in the passage 35 communicating directly with inlet 11. Deflector rib 42 functions to divide the incoming fluid stream to prevent blows from suspended solid objects on the screens 19 and 20 as above described. Where the scraping means is disposed other than adjacent the inlet as shown in FIG. 1 (for example, disposed as shown in FIGS. 10–12), a conventional deflector rib is provided across the mouth of the passage at its entry to the screen chamber.

As shown in FIGS. 1 and 4 there is desirably provided a draft 90 of about 5° on the clamping bar 41 and on the supporting lugs or ribs 43 and 44 in the strainer casing. The purpose of the draft is to protect the screen and to insure that hydraulic pressure bearing against the combined clamping bar 41 and deflector rib 42 cannot cause any upward movement of the scraper-bar assembly.

Where the scraper 40 is to be located in the crown portion of the screen chamber, a convenient configuration for the clamping bar is as shown in FIGS. 13 and 14. The bar here shown is generally of rectilinear configuration, having parallel marginal edges 92 and 93 and tapped holes 94 and 95 which are adapted to receive and retain bolts extending from the scraper. Lateral edges 96 and 97 may be parallel as shown in FIGS. 13 and 14, or where the clamping bar is exposed to the full force of the liquid stream, a slight draft may be provided on the ribs and the bar as above explained, to insure that the scraper-bar assembly is not forced into the screen. Beveled lateral faces 98 and 99 correspond to beveled faces 82 and 83 on the clamping bar-deflector rib composite shown in FIGS. 4–6, and coact with the supporting ribs in the same manner.

There has thus been provided an improved strainer of the type shown and described in Patent No. 2,354,752 and characterized by an improved scraper adapted to coact with a rotary cylindrical screen contained therein when the latter is rotated in either direction to remove sediment from the outer surface thereof without inducing undue wear on either the screen or the scraper. Also means are provided for locating the scraper either above or below the screen with reference to the inlet fluid stream. Where mounted below the screen, it is desirable to cast integrally with the scraper-clamping bar assembly a deflector rib to prevent propulsion of solid suspended matter against the screen. Also, to aid in the location of the scraper along a cylindrical element of the screen parallel to the axis thereof, mounting lands, and a coacting supporting land are provided on the scraper and the clamping bar, respectively.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In combination in a liquid strainer apparatus having a rotary cylindrical straining screen,
   (a) a housing having a pair of oppositely disposed inwardly extending ribs lying in a common plane and partially spanning said housing,
   (b) a screen scraper having an elongated planar body and parallel longitudinal marginal edges, a screen engaging portion having a longitudinal screen engaging face for contacting the exterior of said screen parallel to the axis thereof, said scraper adapted to be supported in said housing adjacent said ribs and spanning the space therebetween, and
   (c) clamping means coacting with said ribs and said scraper to secure said scraper in tight confronting relation to said ribs and in scraping engagement with said cylindrical straining screen, said clamping means including an elongated bar having a length greater than the space between said inwardly extending ribs, complementarily beveled coacting engaging surfaces on each of said ribs and at each extremity of said clamping bar, respectively, and fastening means coacting between said bar and said scraper to fixedly clasp said inwardly extending ribs between the ends of said scraper and said clamping bar respectively, said engaging surfaces respectively coacting to seat said scraper in centered fixedly clasped tight confronting relation to said ribs, and in scraping engagement with said cylindrical straining screen.

2. The combination of claim 1 in which the clamping bar includes a transverse land extending from the surface thereof for engagement with the rib confronting surface of said scraper and between said inwardly extending ribs.

3. The apparatus of claim 1 is which said longitudinal screen engaging face is concave, the radius of concavity being equal to the radius of the external surface of said screen.

References Cited by the Examiner
UNITED STATES PATENTS

| | | | |
|---|---|---|---|
| 2,305,351 | 12/1942 | Hellan | 210—396 X |
| 2,354,752 | 8/1944 | Hellan | 210—329 |
| 2,444,466 | 7/1948 | Peterson | 210—396 |
| 3,140,995 | 7/1964 | Kinney | 210—396 X |

REUBEN FRIEDMAN, *Primary Examiner.*

SAMIH ZAHARNA, *Examiner.*